United States Patent [19]

Giles

[11] Patent Number: 4,917,144
[45] Date of Patent: Apr. 17, 1990

[54] MODULATING PILOT OPERATED SAFETY RELIEF VALVE FOR LOW PRESSURE APPLICATION

[75] Inventor: Gary J. Giles, Pineville, La.

[73] Assignee: Dresser Industries, Inc., Dallas, Tex.

[21] Appl. No.: 307,424

[22] Filed: Feb. 7, 1989

[51] Int. Cl.<sup>4</sup> .......................................... G05D 16/00
[52] U.S. Cl. .................................. 137/488; 137/492.5
[58] Field of Search ............... 137/488, 84, 86, 492, 137/492.5

[56] References Cited

U.S. PATENT DOCUMENTS

| | | | |
|---|---|---|---|
| 3,158,320 | 11/1904 | Duncan | 137/86 X |
| 3,304,951 | 2/1967 | Farris | 137/ |
| 3,326,228 | 6/1967 | Phillips | 137/ |
| 3,362,424 | 1/1968 | Smith et al. | 137/ |
| 3,389,718 | 6/1968 | Johnson et al. | 137/ |
| 3,572,359 | 3/1971 | Weise | 137/ |
| 3,592,224 | 7/1971 | Bois | 137/ |
| 3,631,878 | 1/1972 | Horst | 137/ |
| 3,664,362 | 5/1972 | Weise | 137/ |
| 3,800,822 | 4/1974 | Baker | 137/ |
| 3,807,439 | 4/1974 | Doe | 137/ |
| 4,188,011 | 2/1980 | Akkerman | 251/ |
| 4,250,913 | 2/1981 | Scull | 137/ |
| 4,355,657 | 10/1982 | Reip | 137/ |
| 4,384,590 | 5/1983 | Friend | 137/ |
| 4,586,533 | 5/1986 | Estes | 137/ |
| 4,609,008 | 9/1986 | Anderson | 137/488 |
| 4,632,143 | 12/1986 | McNeely | 137/488 |

Primary Examiner—Alan Cohan

[57] ABSTRACT

A pilot valve operates a main safety relief valve. Two signal sources are registered separately by the pilot valve's pressure cavities for greater sensitivity and modulating action in a non-flowing design.

12 Claims, 6 Drawing Sheets

MODULATING PILOT OPERATED SAFETY RELIEF VALVE FOR LOW PRESSURE APPLICATION

FIELD OF THE INVENTION

This invention pertains to a pilot valve which operates a main safety relief valve. More particularly, the pilot valve controls the main safety relief valve, allowing it to relieve pressure in a modulating fashion.

BACKGROUND OF THE INVENTION

Present day pilot operated safety relief valves (POSRV's) are generally "pop type". The "pop type" POSRV consists of a main valve and a pilot relief valve. The "pop type" pilot valve opens at a predetermined pressure, thus causing the main valve to open. Maximum fluid relieving capacity occurs instantaneously. Because of safety relief valve characteristics, the pressures at which the main valve closes is always less than the relieving set pressure. If the closing pressure becomes too close to the relieving set pressure, damage can result to the main valve seat.

The pressure difference between the opening and closing point of the main valve is referred to as blowdown. In the petrochemical industry, blowdown must be kept to a minimum for economical operation. Therefore, pop type POSRV's which will discharge extremely large quantities of product when called upon to do so could be replaced by modulating POSRV's. Unlike the "pop type" POSRV described above, this invention will allow the main valve to relieve sufficient quantities of fluid media according to the degree of overpressure. In essence, the main valve disc will assume a position in proportion to the percent of overpressure. In a typical POSRV, the dome pressure (that pressure which holds the main valve closed) is reduced to atmospheric pressure almost instantly, allowing the main disc to assume a full open position. Closure occurs in the same manner. The main valve closes by the pilot instantaneously pressurizing the dome.

With this invention, the pilot will allow the dome to remain pressurized at the time the main valve cracks open. Hence, closing pressure will be virtually the same as the opening pressure.

SUMMARY OF THE INVENTION

A modulating pilot valve is provided whereby a pair of differential area diaphragms are mounted on an actuator stem. The pair consists of a signal sensing diaphragm and a dome sensing diaphragm. The diaphragms impart a force on the stem. The force is opposed by a variable compression spring which operates to provide an adjustable set point. The stem actuates a vent valve piston which in turn operates an inlet supply valve which provides adjustable gain to the pilot function.

DETAILED DESCRIPTION

Figure 1:
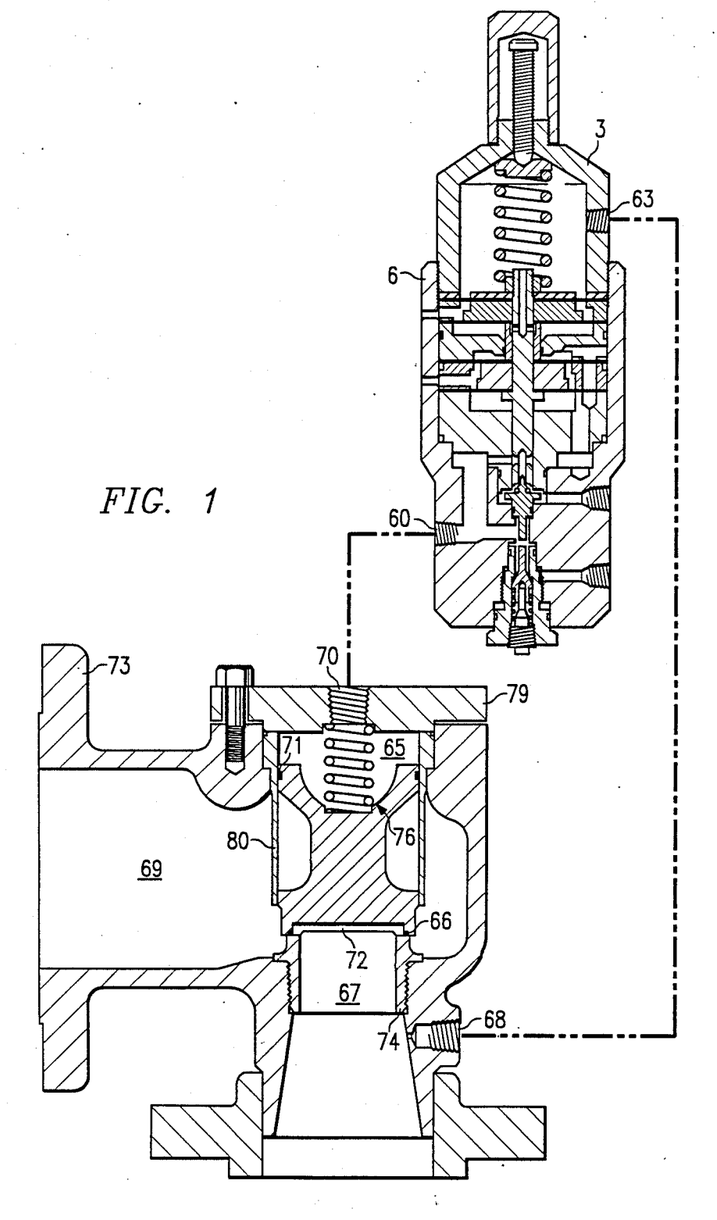
FIG. 1 shows in cross section the main valve, pilot valve and their interconnection.

This invention is for a modulating pilot valve which operates a main safety relief valve. A schematic drawing of this system is shown in FIG. 1. A description of this pilot operated safety relief valve (POSRV) is presented in the following paragraphs.

A. Description of Main Valve

Referring to FIG. 1, the main valve consists of valve body 73, seat bushing 74 and disc assembly 76. The disc assembly consists of an "O" ring seat seal 66 contained by "O" ring retainer 72. The disc 76 is contained within the valve body 73 by a dome cover 79. The disc 76 is allowed to move within the valve body and is guided by disc guide 80. Dome pressure cavity 65 contains dome fluid pressure and is isolated from discharge port 69 through dome "O" ring seal 71. The main valve inlet port 68 allows communication of fluid pressure to pilot valve supply inlet port 63. Dome inlet port 70 also allows communication of dome pressure between port 70 and pilot valve port 60.

B. Pilot Valve Components

Figure 2:
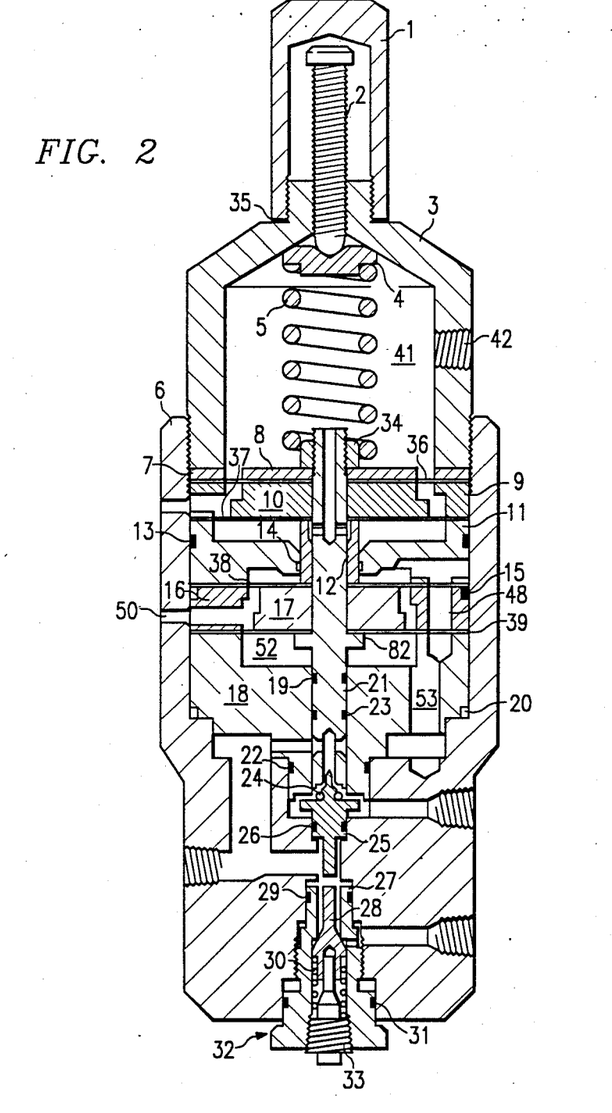
FIG. 2 shows in cross section, the pilot valve components.
Figure 2A:
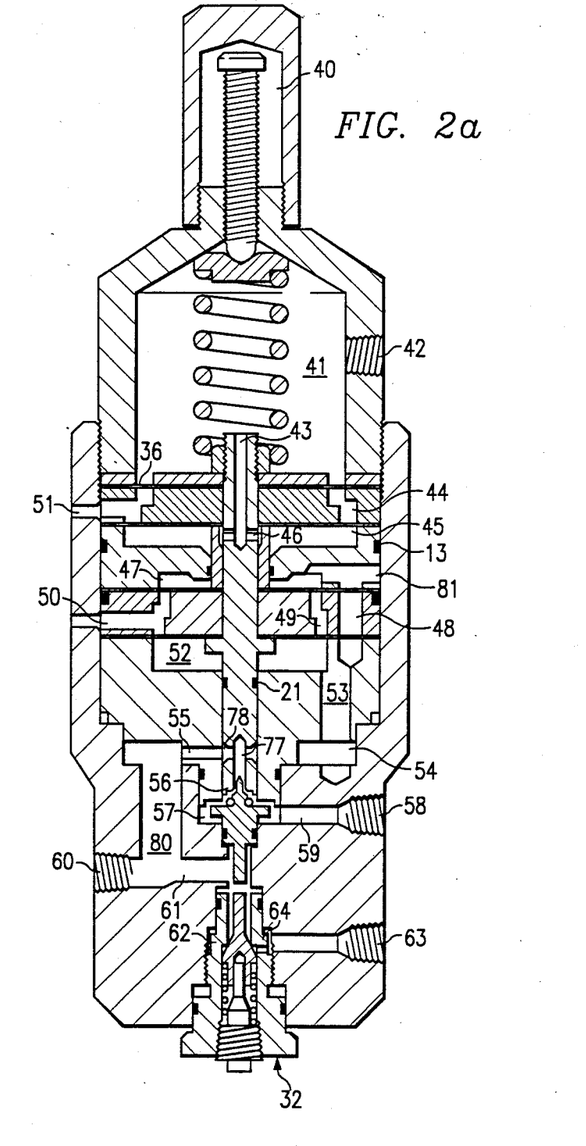
FIG. 2A shows in cross section the pressure containing cavities of the pilot valve.

With reference to FIGS. 1, 2 and 2A, the modulating pilot valve consists of a bonnet 3 and body 6 which enclose the major valve components (see FIG. 2). FIG. 2 identifies various valve components and FIG. 2A illustrates the pressure sensing cavities that these components envelop.

Compression screw 2 which is threaded into bonnet 3 allows for adjustment of spring tension in spring 5. Spring force is transmitted from compression screw 2 to upper spring washer 4 through spring 5 and finally to washer 8. The bottom end of spring 5 is guided by spring guide nut 34. The spring guide nut 34 fastens to the actuator stem 21. This allows for a sealing force to be transmitted to washer 8.

The spring force acting on washer 8 is transmitted to diaphragm 36, upper diaphragm plate 10 and diaphragm 37. The upper diaphragm exerts a downward force to actuator guide sleeve 12, diaphragm 38, lower diaphragm plate 17 and diaphragm 39. The diaphragm 39 bears against the actuator stem flange 82. These pilot valve components are the primary moving parts that are being actuated by the signal and dome pressure sources.

The above primary moving members, in conjunction with other pilot valve components, envelope six pressure sensing cavities. These cavities are shown in FIG. 2A.

The bonnet signal cavity 41 is bounded by bonnet 3, diaphragm 36, washer 8 and actuator stem 21. This cavity is in direct communication with cavity 45 through ports 43 and 46 formed in an upper part of the actuator stem 21. Cavities 41 and 45 are pressurized as a result of their communication with signal sense inlet port 42, supply inlet port 63 and main valve inlet sense port 68.

The lower signal sense cavity 45 is bounded by body 6, "O" ring 13, lower signal diaphragm 37, "O" ring 14 and actuator guide sleeve 12. Between lower signal cavity 45 and bonnet signal cavity 41 is the signal vent cavity 44. This cavity registers atmospheric pressure and is bounded by "O" ring 13, diaphragms 36 and 37 and upper diaphragm plate 10. The signal vent cavity 44 registers ambient pressure through signal vent port 51.

The lower set of sensing cavities are: the upper dome sense cavity 47 which is enveloped by "O" ring 13, body 6, upper dome diaphragm 38, guide sleeve 12, "O" ring 14 and upper signal/dome diaphragm vent support plate 11. The support plate 11 also serves as the top guide for the actuator guide sleeve 12. The guide sleeve 12 guides the actuator stem 21. Cavity 47 is in communication with the lower dome sense cavity 52 through upper dome sense ports 81 and 48 and finally through port 53. Lower dome sense cavity 52 is bounded by "O" ring 19, lower dome diaphragm 39, actuator guideplate 18 and actuator stem 21. Both dome sense cavities 48 and 52 are registered in port 53, annular dome entrance port 54, ports 83 and 61, pilot dome inlet port 60 and finally in main valve dome chamber 65 through port 70. Other ports in communication with dome sense cavities are exhaust ports 55, 78 and 77.

The lower section of the body 6 comprises of the exhaust piston 25 and "O" rings 26 and 24. The bottom set of components make up the gain adjust piston assembly 32 which includes the supply piston 28, supply piston return spring 30, spring guide 33, gain adjust piston 27 and "O" rings 29 and 31. This assembly is threaded into body 6.

C. Main Valve Operation

Referring to FIG. 1, the main valve is the primary relieving device of the pilot operated safety relief valve. The valve disc 76 is held closed due to a net downward force which is produced due to the difference in the areas above disc 76 and the area below the disc 76. During normal operating pressures, cavities 67 and 65 are sensing inlet pressure. A net downward force holds disc 76 closed. For the main valve to open, the pressure in the dome must be reduced such that the pressure in dome cavity 65 results in a force less than the force produced as a result of inlet pressure exposed to the area generated by "O" ring 66.

D. Modulating Pilot Valve Operation

The pilot valve controls the pressure in the main valve dome cavity 65 (see FIG. 1).

For the main valve to open, the dome pressure must be reduced such that the net force acting on the bottom of the valve disc 76 is in the upward direction. This invention allows the main valve to modulate (open slightly then close) by controlling the pressure within the dome cavity 65 (see FIG. 1).

For maximum sensitivity to pressure changes, two signal sources are separately registered by the pilot valve pressure cavities (see FIG. 2A). Inlet pressure is registered in signal chambers 41 and 45. Since the diaphragm area under diaphragm 37 is greater than the diaphragm area developed by diaphragm 36, a net upward force exists. The magnitude of this force is equal to the working area of cavity 45 minus the working area diaphragm 37 times the inlet signal pressure $P_1$. Between these two inlet signal chambers is the signal vent cavity 44 which allows unrestricted movement of diaphragms 36 and 37. Ambient air movement is directed through signal vent port 51.

The next set of signal chambers include dome sense cavity 47 and 52. The diaphragm area exposed in the lower dome sense chamber 52 is greater than the area exposed in the upper dome sense chamber 47. This results in a net upward force equal to the working area of cavity 52 minus the working area of cavity 47 times the dome pressure $P_D$ registered in these chambers (see FIG. 2A).

Between cavities 47 and 52 is the dome vent port 50 which serves the same purpose as the signal vent cavity 44. That is, it allows unrestricted movement of diaphragms 38 and 39.

The two net upward forces oppose the spring force exerted by spring 5.

Figure 3:
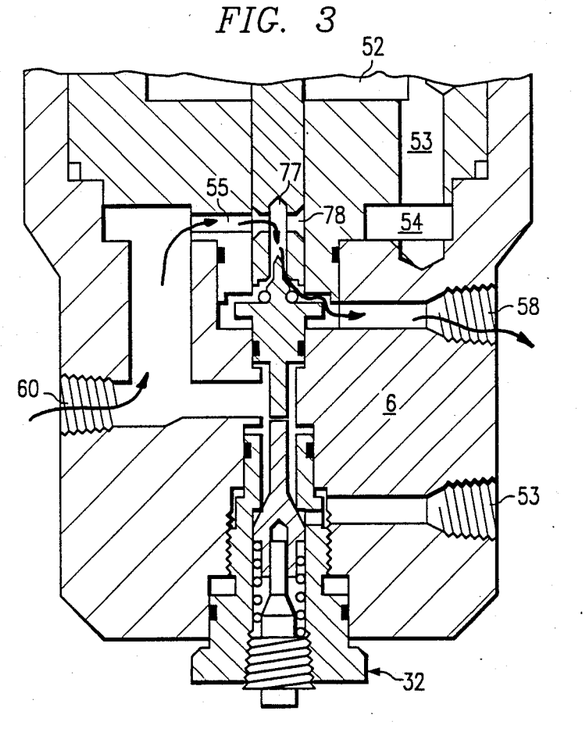
FIG. 3 shows in cross section the pilot valve exhausting in the unbalanced state.

An upward movement of actuator stem 21 will occur once the equilibrium is disturbed between upward acting pressure forces and the downward acting spring force. The position of the stem 21 after its upward movement is illustrated in FIG. 3. This position results in a discharge of fluid pressure from the dome sensing cavities 47 and 52 through ports 53, 54, 55, 78, 77 and finally through exhaust port 58. The main valve dome cavity 65 will also be exhausted since it is in communication with cavities 47 and 52.

Figure 4:
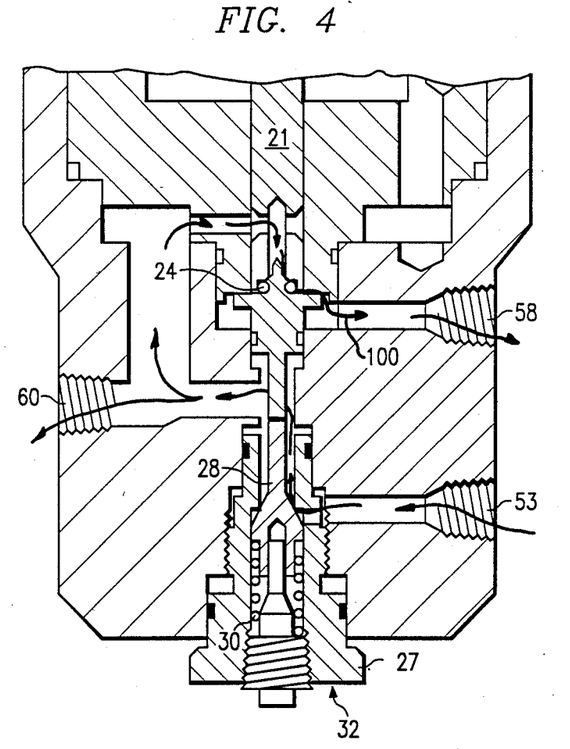
FIG. 4 shows in cross section the balanced no-flow state of the pilot valve.

FIG. 4 illustrates a balanced state where the upward acting forces mentioned above are equal to the downward acting spring force. For all practical purposes, this would provide a no flow situation. A slight leakage as shown by arrow 100 will occur from exhaust piston port 57 which will cause an unbalanced state and the resultant net force downward will allow the actuator stem to seal on exhaust "O" ring seal 24. At the same instant, the supply piston 28 will be moved away from its seat to open the supply piston port 62 and cavities 65, 52 and 47 will be repressurized until a balance is achieved. This action will be continuous as long as inlet pressure remains constant and actual movement of the actuator stem 21 will be extremely small.

Figure 5:
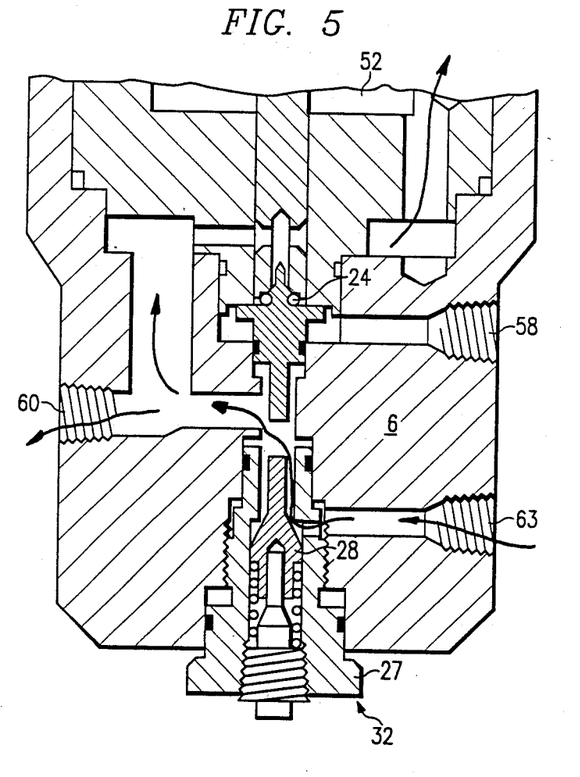
FIG. 5 shows in cross section the unbalanced state of the pilot valve when the dome chamber is being pressurized.

FIG. 5 illustrates the actuator stem 21 in its extreme downward position. Again, this is an unbalanced state in which the downward spring force is greater than the upward forces generated in the dome sense cavities 52 and 47 and a signal sense cavities 41 and 45. Under this condition, the dome sense cavities 47, 52 and main valve dome cavity 65 are sealed from any fluid discharge through exhaust port 58 by "O" ring 24. The supply piston 28 is in its full open position as shown in FIG. 5. This permits supply piston port 62 to open and repressurize the dome sense cavities 47 and 52 and main valve dome cavity 65.

E. Main Valve and Pilot Valve Operation

A primary design requirement of any pilot operated safety relief valve (POSRV) is that the main valve as well as the pilot valve must be leak tight up to 95% of the set pressure. For this modulating POSRV design, the pressure in the dome cavity 65 must be reduced to approximately 70% of the desired set pressure for the main valve to open. Therefore, the pilot must reduce the dome cavity 65 to approximately 30% of desired set pressure. This reduction in dome pressure must initiate at 95% of set pressure. Therefore, for a 1% increase in inlet pressure, the dome pressure must be reduced approximately 6%. This same ratio exists in the pilot sensing cavities. Hence, the net diaphragm area of the signal sensing cavities 41 and 45 must be equal to or greater than 6 times the net diaphragm area of the dome sensing cavities 52 and 47.

When the main valve inlet pressure is below 95% of the desired set pressure (see FIG. 5), dome pressure equals inlet pressure because the net upward force produced due to the sensing chambers 41, 45, 52 and 47 is less than the opposing spring force of spring 5. This spring force is determined in the following manner, $F_X$ = (desired set pressure times the net inlet signal diaphragm area) plus (0.70 times the desired set pressure times the net dome signal diaphragm area). Since inlet pressure is the supply pressure source to the dome chambers 65, 52 and 47, a force balance situation cannot be obtained in the pilot valve until the inlet pressure reaches approximately 90% of set pressure. In essence, the pilot remains in a position as shown in FIG. 5 at operating pressures less than 90% of set pressure. That is, there is no flow through the pilot valve piston exhaust port 56 and the dome pressure is always equal to inlet pressure up to this point. From 90% to 95% of set pressure, a balance can occur and exhaust piston 25 will travel from its lowest position (FIG. 5) to its highest position (FIG. 4) when pressure increases from 90% of set pressure. At 95% of set pressure, the pilot valve is in a balance position (FIG. 4) and its operation commences. As inlet pressure increases, the following mathematical expression must be satisfied (refer to FIG. 1):

$$F_X = P_i A_i + P_D A_D \quad (1)$$

where
- $P_i$ = inlet pressure
- $A_i$ = net working area of signal diaphragm 36 & 37
- $P_D$ = dome pressure
- $A_D$ = net working area of signal diaphragms 38 & 39

(see FIG. 1)

Since the inlet pressure is the signal source, the dome pressure must change to maintain balance according to Equation (1). With each incremental increase in inlet pressure, the dome pressure in cavities 47, 52 and 65 will be reduced in proportion to the inlet pressure increase. When inlet pressure increases, the actuator stem 21 travels upward and opens exhaust port 56 (FIG. 3) which allows the dome chambers to bleed off until the forces are equal. Conversely, if there is a decrease in the inlet pressure say from 96% of set pressure to 95%) the opposite will occur: the spring force exerted by spring 5 is greater than the forces developed in the inlet signal sense and dome sense cavities which causes the actuator stem 21 to move down closing exhaust port 56 and opening supply port 62 (FIG. 5). When this occurs, dome cavities are pressurized until a balance is re-established as shown in FIG. 4.

When set pressure is reached, the pilot has exhausted the dome chambers to approximately 70% of set pressure where the force on top of the main valve disc 76 is slightly less than the force under the disc 76 allowing the disc to rise. If inlet pressure continues to increase beyond set pressure, the dome pressure will be further reduced allowing the main valve disc 76 to travel further upward. As the main valve discharges through discharge port 69 and inlet pressure starts to drop, the pilot valve will repressurize the dome cavities and disc 76 will move downward but not to a closed position. Finally, when the pressure is reduced just below the set pressure, the dome cavity 65 will be at a pressure which will allow the main valve disc to close.

During the operation of the pilot valve, if pressure changes are small, exhaust piston 25 will remain in a position as shown in FIGS. 3 and 4. Movement will occur when large inlet pressure decreases are sensed, allowing an increase in fluid flow rate to the dome chambers, therefore, increasing the response time of the system. Fine tuning is made possible by the addition of the gain adjust piston 27 which controls the relative position of the supply piston 28 with respect to the exhaust piston 25. This adjustment enables optimum sensitivity to inlet pressure changes.

Unlike conventional "pop type" pilot valves, this invention controls the pressure in the main valve dome according to the inlet pressure which is the signal source. Dome pressure is inversely proportional to the signal source pressure.

During the operational pressure range 95% of set pressure to overpressure) the pilot will exhaust and supply the dome and dome sensing cavities in such a manner that a very small amount of fluid replenishment or discharge is required to maintain a balanced state. Hence, one would categorize this pilot valve as a non-flow type pilot. Maximum flow will occur only when large inlet pressure changes are sensed. For example, if inlet pressure is reduced or increased 5% of set pressure instantaneously. Minimizing flow within the pilot will reduce pilot valve maintenance in particular when the fluid media is dirty gas.

If remote mounting of the pilot valve from the main valve is desired, the response time of the main valve opening is not affected since the pilot will have reduced the main valve dome pressure to near the desired pressure for valve opening. Conventional pop types and modulating types operate at the main valve set pressure; therefore, the time delay between pilot opening and main valve opening is dependent upon distance and piping size.

Another feature of this invention is the incorporation of the gain adjust position assembly 32 which enables the minimization of fluid flow through the pilot valve. Since only minute flow capacity is required, the movement of actuator stem 21 and supply piston 28 is extremely small. Therefore, the spring rate of spring 5 becomes less critical allowing pressure setting ranges to be large.

The primary design feature is the utilization of a force balance mechanism with the sensing areas sized to achieve this unique operation of the main valve in a modulating fashion. With this area sizing both the pilot valve and the main valve will be leak tight up to and including 95 percent of set pressure.

In this force balance device, the utilization of net diaphragm areas enveloped by the signal sense cavities, 41 and 45, and the dome sense cavities 47 and 52 allow the use of smaller spring loads while maintaining flexibility and sensitivity to inlet pressure signal changes.

Accordingly, what is claimed is:

1. A modulating pilot valve, comprising:
   a signal pressure sensing diaphragm pair comprising a first and second signal sensing diaphragm, mounted adjacent one another to an actuator stem, the signal sensing diaphragm pair having between them a first vent cavity, each signal sensing diaphragm having an interior face exposed to the first vent cavity, and an exterior face, the exterior face of the first signal sensing diaphragm being exposed to an upper signal cavity, the exterior face of the second signal sensing diaphragm being exposed to a lower signal cavity, the upper and lower signal cavities communicating and adapted to respond to a varying signal pressure;
   a dome sensing diaphragm pair comprising a first and a second dome sensing diaphragm, mounted adjacent one another to the actuator stem, the dome sensing diaphragm pair having between them a second vent cavity, each dome sensing diaphragm having an interior face exposed to the second vent cavity, and an exterior face, the exterior face of the first dome sensing diaphragm being exposed to an upper dome signal cavity, the exterior face of the second dome sensing diaphragm being exposed to a lower dome signal cavity, the upper and lower dome signal cavities communicating and adapted to contain a dome pressure;

the area of the second signal sensing diaphragm being greater than the area of the first signal sensing diaphragm to thereby define a first area difference, the difference in area acting in response to pressure to displace the actuator stem when the signal pressure is in excess of the pressure in the first vent cavity, in a first direction of travel, the displacement of the stem in the first direction being resisted by a compression spring functioning to bias the actuator stem;

the area of the second dome sensing diaphragm being greater than the area of the first dome sensing diaphragm to define a second area difference, the second difference in area acting in response to pressure to displace the actuator stem when the dome pressure is in excess of the pressure in the second vent cavity, in the first direction of travel; and the pilot valve further comprising an exhaust piston which sealingly engages with the actuator stem, the actuator stem having a central fluid passage in communication with the dome sensing cavities and a dome inlet port, and when said actuator stem is disengaged from said exhaust piston, dome pressure is allowed to escape from an exhaust port, the exhaust piston further cooperating with a resiliently biased inlet supply valve adapted to admit a pressure from an inlet port into the dome sensing cavities and the dome inlet port when engaged by the exhaust valve.

2. The modulating pilot valve of claim 1, wherein the inlet supply valve is received within a sleeve which is adjustably movable with respect to the exhaust piston so as to provide gain adjustment.

3. A modulating pilot valve, comprising:
a bonnet signal cavity exposed to a signal pressure from a main valve;
an upper signal pressure sensing diaphragm separating the bonnet signal cavity from a first vent cavity;
a lower signal pressure sensing diaphragm separating the first vent cavity from a lower signal cavity, the upper and lower signal cavities being in fluid communication;
an upper dome cavity exposed to a dome pressure from a main valve;
an upper dome pressure sensing diaphragm separating the upper dome sensing cavity from a second vent cavity;
a lower dome pressure sensing diaphragm separating the second vent cavity from a lower dome cavity, the upper and lower dome cavity being in fluid comminication
the dome and signal pressure sensing diaphragms being mounted to an actuator having an upper end which bears against a resilient bias and a lower end having a central fluid passage communicating with the dome signal cavities; and
the lower end of the actuator being sealable against an exhaust valve piston and adapted to urge the exhaust valve piston into contact with a resiliently biased inlet supply valve, the inlet supply valve adapted to admit signal pressure into the dome cavities when acted upon by the exhaust valve piston.

4. The modulating pilot valve of claim 3, wherein said supply valve includes a core, and the core and resilient bias of the supply valve are received within an adjustable sleeve, the sleeve being movable with respect to the exhaust valve piston so as to provide gain adjustment.

5. In a modulating pilot valve, the improvement comprising:
a pair of signal pressure sensing diaphragm having different pressure reacting areas and a first vent cavity therebetween;
a pair of dome pressure sensing diaphragms having different pressure reacting areas and a second vent cavity therebetween;
said signal and dome pressure sensing diaphragm pairs being constructed so as to exert forces in the same direction; and
the signal and dome pressure sensing diaphragms being affixed to an actuator which operates on a means for exhausting a main valve dome cavity and a means for admitting a signal pressure into the main valve dome.

6. The modulating pilot valve of claim 5, wherein the means for admitting signal pressure is displaceable from the means for exhausting the main valve so as to provide gain adjustment.

7. The modulating pilot valve of claim 5, wherein the means for exhausting the main valve dome cavity comprises a piston having a first end which forms a seal against a fluid passage formed in a lower end of the actuator, the fluid passage communicating with a source of dome pressure.

8. The modulating pilot valve of claim 7, wherein the means for admitting a signal pressure into the main valve dome comprises a resiliently biased valve core actuable by a second end of the piston.

9. The modulating pilot valve of claim 8, wherein the valve core and its resilient bias are received within a sleeve, the distance between the second end of the piston and the sleeve being adjustable so as to provide gain adjustment.

10. A pilot valve modulating assembly, comprising:
a main relief valve having a disc valve which is spring biased to permit controlled passage of a fluid between an inlet port and outlet port, said disc valve forming part of a dome cavity connected to a dome inlet port;
a pilot relief valve having;
a spring biased actuator stem;
a signal pressure sensing diaphragm assembly connected to the actuator stem for urging the stem in a direction opposing the spring bias in an amount proportional to the inlet port pressure of said main relief valve which exceeds a predetermined pressure;
a dome signal pressure sensing diaphragm assembly connected to the actuator stem for urging the stem in a direction opposing the spring bias;
an exhaust valve operable in response to movement of said actuator stem such that an increased inlet port pressure causes said exhaust valve open in a proportionate amount to relieve pressure in the dome chamber of said main valve, thereby allowing said disc valve to open in an amount corresponding to the inlet port pressure; and a supply valve operable in response to reduced inlet port pressures in which said actuator steam moves in a direction biased by said spring, and such that inlet port pressure is communicated to said dome cavity for recharging thereof.

11. The pilot valve modulating assembly of claim 10, wherein said exhaust valve is disposed between said stem and said supply valve such that movement of said stem in one direction urges said exhaust valve against said supply valve to thereby close said exhaust valve and open said supply valve.

12. The pilot valve modulating assembly of claim 10, wherein said signal pressure sensing diaphragm assembly includes a pair of diaphragms having a common vented cavity therebetween, and respective cavities on other sides of said signal sensing diaphragms, said other respective cavities being connected together by a channel formed in said actuator stem.

* * * * *

UNITED STATES PATENT AND TRADEMARK OFFICE
CERTIFICATE OF CORRECTION

PATENT NO. : 4,917,144

DATED : April 17, 1990

INVENTOR(S) : Gary J. Giles

It is certified that error appears in the above-identified patent and that said Letters Patent is hereby corrected as shown below:

Column 1, line 27, after "down" insert --.--

Column 3, line 53, "signal chambers" should be --signal cavities--.

Column 3, line 58, before "diaphragm 37" insert --of--.

Column 3, line 64, "cavity" should be --cavities--.

Column 5, line 38, before "say" insert --(--.

Column 6, line 8, before "95%" insert --(--.

Column 7, line 58, "cavity" should be --cavities--.

Column 7, line 59, "comminication" should be --communication;--.

Column 8, line 12, "diaphragm" should be --diaphragms--.

UNITED STATES PATENT AND TRADEMARK OFFICE
CERTIFICATE OF CORRECTION

PATENT NO. : 4,917,144

DATED : April 17, 1990

INVENTOR(S) : Gary J. Giles

It is certified that error appears in the above-identified patent and that said Letters Patent is hereby corrected as shown below:

Column 8, line 64, after "valve" insert --to--

Signed and Sealed this

Twenty-fifth Day of June, 1991

Attest:

HARRY F. MANBECK, JR.

*Attesting Officer*     Commissioner of Patents and Trademarks